United States Patent
Purushe

(10) Patent No.: US 11,153,581 B1
(45) Date of Patent: Oct. 19, 2021

(54) INTRA-SEGMENT VIDEO UPSWITCHING WITH DUAL DECODING

(71) Applicant: Twitch Interactive, Inc., San Francisco, CA (US)

(72) Inventor: Nikhil Purushe, San Francisco, CA (US)

(73) Assignee: Twitch Interactive, Inc., San Francisco, CA (US)

( * ) Notice: Subject to any disclaimer, the term of this patent is extended or adjusted under 35 U.S.C. 154(b) by 0 days.

(21) Appl. No.: 16/877,744

(22) Filed: May 19, 2020

(51) Int. Cl.
　　*H04N 19/30*　　(2014.01)
　　*H04N 19/115*　　(2014.01)
　　*H04N 19/44*　　(2014.01)
　　*H04N 19/184*　　(2014.01)
　　*H04N 19/154*　　(2014.01)

(52) U.S. Cl.
　　CPC .......... *H04N 19/30* (2014.11); *H04N 19/115* (2014.11); *H04N 19/154* (2014.11); *H04N 19/184* (2014.11); *H04N 19/44* (2014.11)

(58) Field of Classification Search
　　CPC .... H04N 19/30; H04N 19/184; H04N 19/115; H04N 19/44; H04N 19/154
　　USPC ...................................................... 348/397.1
　　See application file for complete search history.

(56) References Cited

U.S. PATENT DOCUMENTS

| | | | |
|---|---|---|---|
| 9,300,710 B2 | 3/2016 | Winterrowd et al. | |
| 9,324,375 B1 | 4/2016 | Casalena et al. | |
| 9,571,702 B2 * | 2/2017 | Sullivan | H04N 19/427 |
| 9,756,102 B2 | 9/2017 | Mao et al. | |
| 9,788,077 B1 | 10/2017 | Shen et al. | |
| 9,813,740 B2 * | 11/2017 | Panje | H04N 21/23439 |
| 10,313,412 B1 | 6/2019 | Hall et al. | |
| 10,326,814 B1 | 6/2019 | Hall et al. | |
| 10,397,291 B1 | 8/2019 | Hall et al. | |
| 2004/0001547 A1 | 1/2004 | Mukherjee | |
| 2006/0083315 A1 * | 4/2006 | Sato | H04N 5/4401 375/240.25 |
| 2006/0233247 A1 | 10/2006 | Visharam et al. | |
| 2006/0233259 A1 * | 10/2006 | Chou | H04N 19/102 375/240.21 |
| 2008/0273094 A1 | 11/2008 | Kunieda | |

(Continued)

OTHER PUBLICATIONS

U.S. Appl. No. 16/707,768, filed Dec. 9, 2019, Purushe.

(Continued)

*Primary Examiner* — Michael Lee
(74) *Attorney, Agent, or Firm* — BakerHostetler

(57) ABSTRACT

During downloading and decoding of a lower-quality video version of a video segment, an up-switch condition may be detected. An intra-segment up-switch to a higher-quality version of the segment may then be made. In particular, the higher quality version may be downloaded and decoded at least partially concurrently with the lower-quality version, for example using a dual decoder arrangement. A first portion of the lower-quality version may be displayed. The first portion of the lower-quality may extend from a start of the segment to an intermediate position of the segment. At the intermediate position, playing may be switched from the lower-quality version to the higher-quality version. A second portion of the higher-quality version may be displayed. The second portion of the higher-quality version may extend from the intermediate position to an end of the segment.

20 Claims, 9 Drawing Sheets

(56) References Cited

U.S. PATENT DOCUMENTS

| | | |
|---|---|---|
| 2009/0307367 A1 | 12/2009 | Gigliotti |
| 2009/0316795 A1* | 12/2009 | Chui .............. H04N 21/440263 375/240.25 |
| 2012/0189278 A1* | 7/2012 | Oshima ................ H04N 13/194 386/248 |
| 2013/0089142 A1 | 4/2013 | Begen et al. |
| 2014/0143439 A1 | 5/2014 | Ramamurthy |
| 2016/0105724 A1* | 4/2016 | Bloch ................ H04N 21/2365 725/38 |
| 2016/0191585 A1 | 6/2016 | Ramamurthi et al. |
| 2016/0212189 A1 | 7/2016 | Zhang |
| 2016/0330453 A1 | 11/2016 | Zhang et al. |
| 2017/0041238 A1 | 2/2017 | Do et al. |
| 2017/0208350 A1* | 7/2017 | Herrick .............. H04N 21/4621 |
| 2017/0257674 A1* | 9/2017 | Horita .................... G11B 27/34 |
| 2017/0262707 A1* | 9/2017 | Zhao .................. G06K 9/00751 |
| 2020/0195997 A1* | 6/2020 | Yoshikawa ........ H04N 21/2387 |

OTHER PUBLICATIONS

Xu et al.; "Dissecting VOD Services for Cellular; Performance, Root Causes and Best Practices"; In Proceedings of the Internet Measurement Conf.; Nov. 2017; p. 220-234.

U.S. Appl. No. 16/707,768; Notice of Allowance; dated Dec. 10, 2020; 9 pages.

U.S. Appl. No. 16/707,768; Notice of Allowance; dated Mar. 25, 2021; 8 pages.

\* cited by examiner

US 11,153,581 B1

INTRA-SEGMENT VIDEO UPSWITCHING WITH DUAL DECODING

BACKGROUND

The popularity of video streaming has increased rapidly in recent years. In some examples, video of a live event, such as a video game, news event, sporting event, etc. may be captured and streamed to viewers over one or more networks. In these and other cases, it may be desirable for video to be transmitted with low latency, for example such that actions within video may be seen by viewers while they are still occurring or shortly after their occurrence. This may, in some cases, be particularly advantageous when users are commenting, chatting or otherwise describing actions within these live events. One commonly employed streaming technique is adaptive bitrate (ABR) streaming, in which a video stream is encoded using multiple versions that may differ with respect to various image quality attributes (e.g., bitrates, resolutions, profiles, frame rates, etc.). These different image quality versions may sometimes be referred to as different renditions of the video content. Each recipient of a transmission may then determine which version to download depending on various transmission characteristics, such as network conditions (e.g., available network bandwidth, throughput, etc.). In ABR streaming, video streams are encoded into small segments. For different segments, recipients may optionally dynamically switch between versions, such as based on whether network conditions are improving or declining. In addition to changes in network quality, other events may also cause switches between different quality versions. For example, reducing video from a larger, regular-sized display to a smaller display, sometimes referred to as mini-mode, may cause the video to be displayed at a lower image quality. Additionally, enlarging of video from the smaller display back to the regular-sized display may cause the video to return to a higher-quality. Furthermore, during the initial start-up stages of a video transmission, the video may sometimes be displayed at a lower image quality, sometimes referred to as a safe quality, and may then improve to a higher-quality as network conditions permit.

BRIEF DESCRIPTION OF DRAWINGS

The following detailed description may be better understood when read in conjunction with the appended drawings. For the purposes of illustration, there are shown in the drawings example embodiments of various aspects of the disclosure; however, the invention is not limited to the specific methods and instrumentalities disclosed.

DETAILED DESCRIPTION

Figure 1:
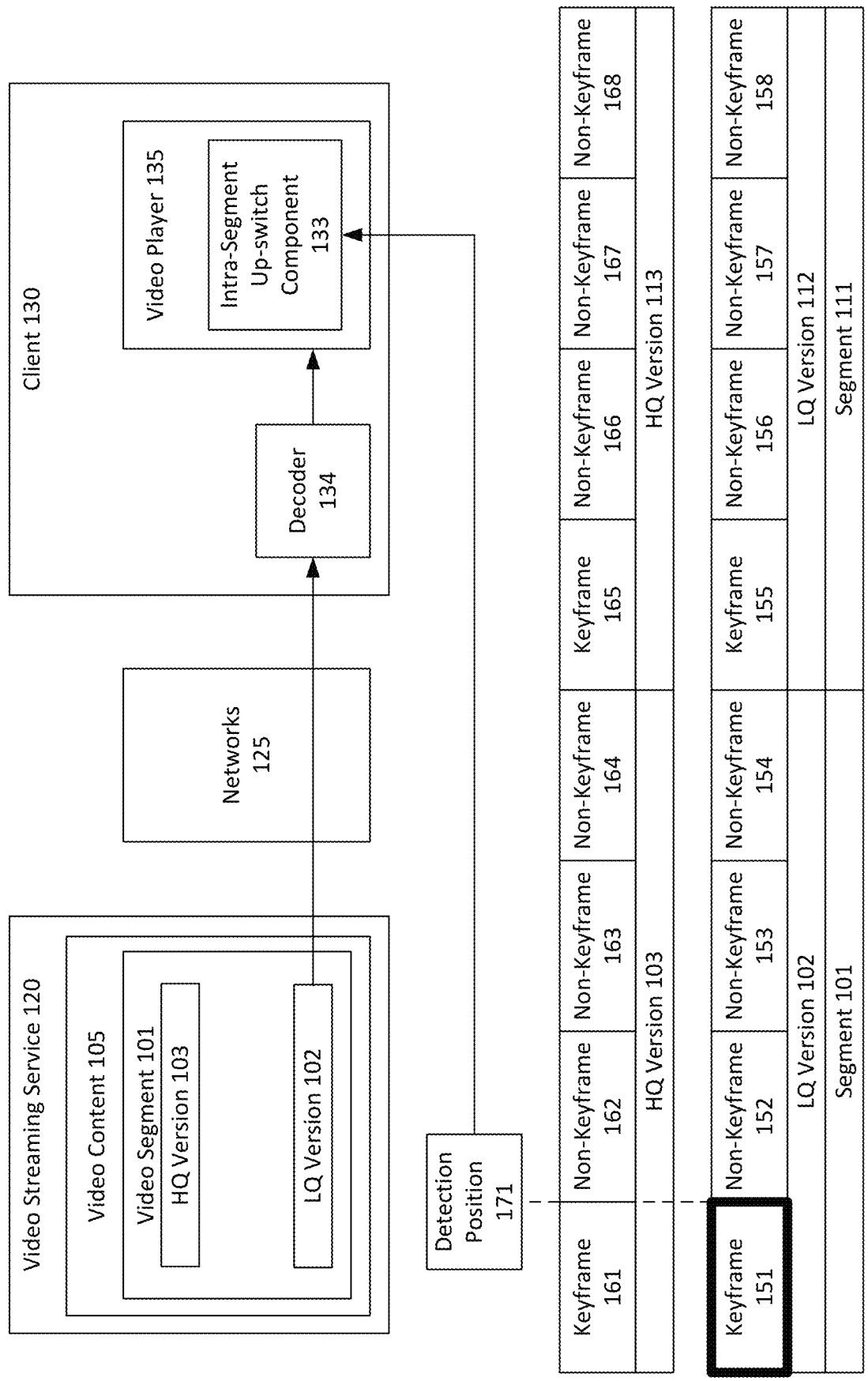
FIG. 1 is a diagram illustrating an example intra-segment up-switch system (prior to an up-switch determination) that may be used in accordance with the present disclosure.

Techniques for intra-segment video up-switching with dual decoding are described herein. In some examples, video content may be transmitted from a video streaming service to one or more video players over one or more communications networks. In some examples, a streamer may capture video content and transmit the video content to a video streaming service. The video streaming service may then, in turn, transmit the video to a number of video players for display to viewers. In one specific example, a streamer may be a playing a video game and simultaneously capturing and transmitting video of the game that he or she is playing. In some examples, the video content may be transmitted to viewers and played using live streaming techniques. For example, video content of an event (e.g., video game) may be transmitted to viewers, and at least part of the video content may be played while the event is still occurring (e.g., while the video game is still being played by the streamer), albeit with some small amounts latency between the time that video content is captured by the provider and the time that the video is eventually played to viewers.

The video may be transmitted using adaptive bitrate (ABR) streaming techniques, in which a video stream is encoded using multiple versions that may differ with respect to various image quality attributes (e.g., bitrates, resolutions, profiles, frame rates, etc.). These different image quality versions may sometimes be referred to as different renditions of the video content. Each recipient of a transmission may then determine which version to download depending on various transmission characteristics, such as network conditions (e.g., available network bandwidth, throughput, etc.). In ABR streaming, video streams are encoded into small segments. For different segments, recipients may optionally dynamically switch between versions, such as based on whether network conditions are improving or declining.

An up-switch is a switch from a lower image quality to a higher image quality. During a streaming transmission, one or more up-switch conditions may be detected, which are conditions that cause a video player to switch from a lower image quality to a higher image quality. One example up-switch condition may occur when video is resized from a smaller display, sometimes referred to as mini-mode, to a larger, regular-sized display. For example, video may often be shown in a smaller display when other content (e.g., another video stream) is in focus on a computer screen. The video may then be re-sized when a user clicks on the smaller display to return focus to the video and enlarge the display of the video. The video may often be displayed in a lower image quality in the smaller display, and the video may then be up-switched to a higher video quality based on the user switching from the smaller display to the regular-sized display. Another example up-switch condition may occur when network conditions improve, such as when changing to a higher-bandwidth network or when a different streaming session on the same network is concluded. Yet another up-switch condition may occur during the beginning stages of a transmission (e.g., a start-up period). During this period, the video may sometimes be displayed at a lower image quality, sometimes referred to as a safe quality, and may then improve to a higher-quality as network conditions permit.

One problem related to ABR streaming is that an up-switch condition may sometimes occur during downloading of a video segment. However, in some conventional streaming techniques, the video player may be incapable of switching to a higher-quality version during playing of a segment. One reason for this is that a video segment may typically begin with a keyframe. After the keyframe, subsequent frames (non-keyframes) within the segment may be expressed as (and/or associated with) a difference (delta) relative to the keyframe and potentially other prior frames. Thus, because the initial frame (the keyframe) may be required for playing subsequent frames, some conventional techniques may not be capable of up-switching to a higher-quality segment version in the middle of a segment. Accordingly, in some examples, if an up-switch condition occurs during playing of a segment, the video player may be forced to continue to download and play the entire remainder of a lower-quality version of the segment (including all remaining frames of the segment). The video player may then up-switch to the higher-quality version when the next segment begins. This may result in the video player continuing to play lower-quality frames for the remainder of the segment, even when download and playback of higher-quality frames could be supported by the available network bandwidth.

In order to alleviate these and other problems, the techniques described herein may allow up-switching from a lower-quality version to a higher-quality version during playing of a segment, such as at one or more intermediate frames of the segment. This may improve the user experience, such as by allowing up-switching rapidly after an up-switch condition is detected, without requiring all remaining frames of a current lower-quality version to be downloaded and played before the up-switch can occur. In some examples, a first portion of a lower-quality version of a video segment may be downloaded and decoded. At some point during the downloading and decoding of the first portion of the lower-quality version, an up-switch condition may be detected. A determination may then be made, based on the up-switch condition, to perform an intra-segment up-switch to a higher-quality version of the video segment. The higher-quality version may then be downloaded and decoded in its entirety. In this scenario, playing of the video segment may include displaying the first portion of the lower-quality version, wherein the first portion extends from a start position of the video segment to an intermediate position of the video segment. Playing of the video segment may also include switching, at the intermediate position, the playing of the video segment from the lower-quality version to the higher-quality version. Playing of the video segment may also include displaying a second portion of the higher-quality version, wherein the second portion extends from the intermediate position to an end position of the video segment.

To allow an intra-segment switch from the lower-quality version to the higher-quality version with no observable delay, the video player may download and decode at least part of the higher-quality version of the segment concurrently (i.e., in parallel) with at least part of the lower-quality version of the segment. To accomplish this, the video player may launch an additional (e.g., secondary) decoder instance to download the higher-quality version of the segment. This, additional decoder may, at least temporarily, execute in combination with a primary decoder instance that is used to decode the lower-quality version of the segment, thereby resulting in a dual decoder arrangement.

In some examples, a portion of the higher-quality version, referred to herein as a skipped portion, may be downloaded and decoded but not displayed by the video player. This skipped portion of the higher-quality version may correspond to the first portion of the lower-quality version, meaning that the skipped portion extends from the start position of the video segment to the intermediate position of the video segment at which the up-switch occurs. Although the skipped portion may not be displayed, downloading and decoding of the skipped portion may nevertheless be necessary because the skipped portion may include a keyframe and potentially other frames required to determine a difference (delta) associated with other subsequent played frames in the subsequent displayed portion of the higher-quality version.

After detection of the up-switch condition, the video player may perform various calculations in order to determine whether to do an intra-segment up-switch of the video content. In some examples, the video player may first determine whether there is sufficient bandwidth to download the current (lower-quality) version in combination with the higher-quality version. If there isn't sufficient bandwidth, then a delay (e.g., buffering condition) may occur, and the video player may then determine not to perform the intra-segment up-switch and instead wait until the next segment to perform the up-switch. If, on the other hand, there is sufficient bandwidth to download both the current (lower-quality) segment and the higher-quality segment, then the video player may determine whether to perform the intra-segment up-switch based at least in part on a progress of the segment. For example, the video player calculate whether there is enough time to download the higher-quality version before the end of the playing of the current segment. If so, then the video player may determine to perform the intra-segment up-switch. If not, then the video player may instead wait until the next segment to perform the up-switch.

FIG. 1 is a diagram illustrating an example intra-segment up-switch system that may be used in accordance with the present disclosure. In the example of FIG. 1, video content 105 is transmitted from a video streaming service 120 to a video player 135 at a client 130 for display to a viewer. Although only a single video player 135 at a single client 130 is shown in FIG. 1, the video content 105 may optionally be concurrently transmitted from the video streaming service 120 to any number of additional clients and video players. The video content 105 may be transmitted from video streaming service 120 to video player 135 over one or more networks 125, for example one or more local area networks (LAN's) and/or one or more wide area networks (WAN's), such as the Internet. Additionally, the video content 105 is transmitted from video streaming service 120 to video player 135 using streaming transmission techniques, in which portions of transmitted content are received and played while subsequent portions of the transmitted content are being transmitted.

In some examples, a streamer (not shown in FIG. 1) may capture the video content and transmit the video content 105 to the video streaming service 120. The video streaming service 120 may then, in turn, transmit the video content 105 to video player 135 (and any number of additional video players) for display to viewers. In one specific example, a streamer may be a playing a video game and simultaneously capturing and transmitting video of the game that he or she is playing. In some examples, the video content 105 may be transmitted to viewers and played using live streaming techniques. For example, video content of an event (e.g., video game) may be transmitted to viewers, and at least part of the video content may be played while the event is still occurring (e.g., while the video game is still being played by the streamer), albeit with some small amounts latency between the time that video content is captured by the provider and the time that the video is eventually played to viewers.

In the example of FIG. 1, the video content 105 is transmitted from video streaming service 120 to video player 135 (and optionally other video players) using adaptive bitrate (ABR) streaming techniques. In ABR streaming, video streams may be encoded into small segments. Each segment of a video stream may be encoded using multiple versions that may differ with respect to various image quality attributes (e.g., bitrates, resolutions, profiles, frame rates, etc.). These different image quality versions may sometimes be referred to as different renditions of the video content. Each recipient of the transmission may then determine which version to download depending on various transmission characteristics, such as network conditions (e.g., available network bandwidth, throughput, etc.). For different segments, individual recipients may optionally dynamically switch between versions, such as based on whether network conditions are improving or declining. For example, as shown in FIG. 1, segment 101 is a current segment that is currently being downloaded by the video player 135, while segment 111 is a subsequent segment that immediately follows segment 101. Segment 101 is encoded into a higher-quality (HQ) version 103 and a lower-quality (LQ) version 102 (and potentially other versions that are not shown), while segment 111 is encoded into a higher-quality (HQ) version 113 and a lower-quality (LQ) version 112 (and potentially other versions that are not shown). In one specific example, HQ versions 113 and 103 could have a resolution of 1080p and LQ versions 112 and 102 could have a resolution of 480p. In some examples, different transmission characteristics may exist with respect to transmission of video content 105 to different recipients. For example, a network connection between video streaming service 120 and video player 135 may be experiencing favorable conditions, while a network connection between video streaming service 120 and another video player may simultaneously be experiencing poor conditions. Additionally, as will be described in detail below, network conditions for each individual recipient may also change over time during the course the transmission of video content 105.

In the example of FIG. 1, segments 101 and 111 each include four frames. Segments may often include more (or possibly less) than four frames, but four frames are employed in this example for purposes of simplicity and ease of illustration. As shown in FIG. 1, the LQ version 102 of segment 101 includes keyframe 151 and three non-keyframes 152-154 (for a total of four frames), while the HQ version 103 of segment 101 includes keyframe 161 and three non-keyframes 162-164 (for a total of four frames). Additionally, the LQ version 112 of segment 111 includes keyframe 155 and three non-keyframes 156-158 (for a total of four frames), while the HQ version 113 of segment 111 includes keyframe 165 and three non-keyframes 166-168 (for a total of four frames).

As shown in FIG. 1, the video player 135 has initially requested to download segment 101 using LQ version 102. Upon being downloaded, the LQ version is decoded by decoder 134. In the example of FIG. 1, the video player 135 has already downloaded and displayed keyframe 151 (as indicated by the thick black outline surrounding keyframe 151). As also shown in FIG. 1, a detection position 171 occurs at the conclusion of keyframe 151. The detection position 171 is a position at which the video player 135 detects an up-switch condition, which is a condition that causes video player 135 to switch from a lower image quality to a higher image quality. The up-switch condition may be detected by intra-segment up-switch component 133. As described above, one example up-switch condition may occur when video is resized from a smaller display, sometimes referred to as mini-mode, to a larger, regular-sized display. For example, video may often be shown in a smaller display when other content (e.g., another video stream) is in focus on a computer screen. The video may then be re-sized when a user clicks on the smaller display to return focus to the video and enlarge the display of the video. The video may often be displayed in a lower image quality in the smaller display, and the video may then be up-switched to a higher video quality based on the user switching from the smaller display to the regular-sized display. Another example up-switch condition may occur when network conditions improve, such as when changing to a higher-bandwidth network or when a different streaming session on the same network is concluded. Yet another up-switch condition may occur during the beginning stages of a transmission (e.g., a start-up period). During this period, the video may sometimes be displayed at a lower image quality, sometimes referred to as a safe quality, and may then improve to a higher-quality as network conditions permit.

As also described above, one problem related to some conventional streaming techniques is that a video player may be incapable of switching to a higher-quality version during playing of a segment. One reason for this is that, after a keyframe, subsequent frames (non-keyframes) within the segment may be expressed as (and/or associated with) a difference (delta) relative to keyframe and potentially other prior frames. Thus, the keyframe may be required for playing subsequent frames in the same version of a segment. For example, keyframe 161 of HQ version 103 may be required to play non-keyframes 162-164 of HQ version 103. Accordingly, in some conventional techniques, without keyframe 161, a video player could not perform an up-switch to HQ version 103 to play keyframes 162-164. Thus, the video player would need to wait until the next segment 111 to up-switch to HQ version 113. The video player would need to download and display all of LQ version 102 (including all of non-keyframes 152-154).

In contrast to these conventional techniques, the techniques described herein may allow video player 135 to up-switch from LQ version 102 to HQ version 103 prior to the end of segment 101. For example, referring now to FIG. 2, it is seen that the, in one example, the video player 135 may continue to download and display non-keyframe 152 of LQ version 102 but may then up-switch to HQ version 103, from which non-keyframes 163 and 164 are displayed. The displaying of non-keyframe 152 from LQ version 102 as well as non-keyframes 163 and 164 from HQ version 103 are indicated by the thick black outlines surrounding those frames in FIG. 2. The up-switch from LQ version 102 to HQ version 103 that occurs between non-keyframe 152 and non-keyframe 163 is referred to as an intra-segment up-switch because it occurs during the playing of segment 101

(as opposed to waiting until the next segment 111 to perform the up-switch). The up-switch position 271 is the position at which the up-switch is performed, which, in this example, is between non-keyframe 152 and non-keyframe 163.

Figure 2:
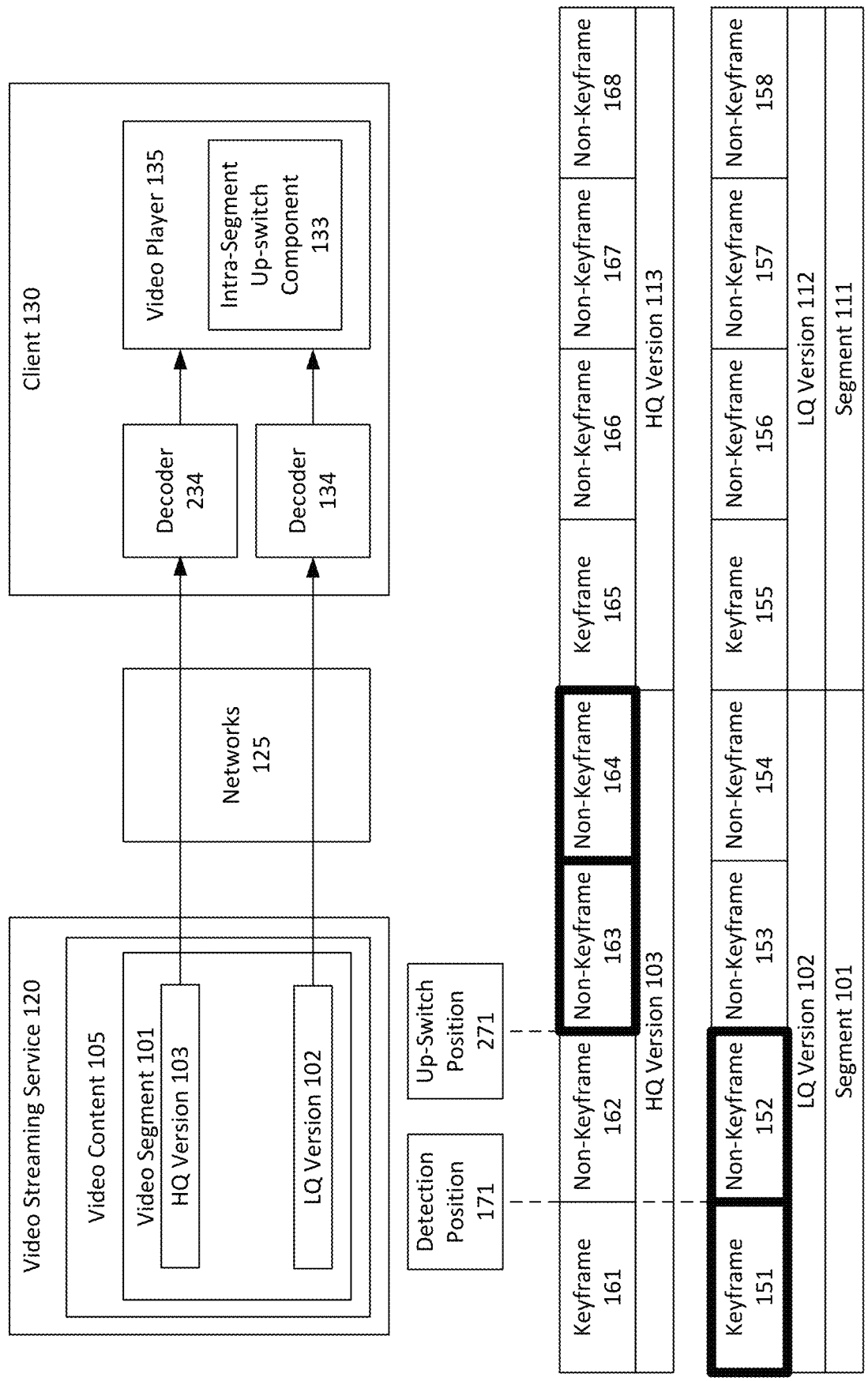
FIG. 2 is diagram illustrating example an example intra-segment up-switch system (after an up-switch determination) that may be used in accordance with the present disclosure.

The intra-segment up-switch component 133 may manage the intra-segment up-switch from LQ version 102 to HQ version 103. In some examples, to allow an intra-segment up-switch from LQ version 102 to the HQ version 103 with no observable delay, the video player 135 may download and decode at least part of the HQ version 103 concurrently (i.e., in parallel) with at least part of the LQ version 102. To accomplish this, the intra-segment up-switch component 133 may launch decoder 234, which is an additional (e.g., secondary) decoder instance to download the HQ version 103. As shown in FIG. 2, the decoder 234 may, at least temporarily, execute in combination with a primary decoder instance (decoder 134) that is used to decode the LQ version 102, thereby resulting in a dual decoder arrangement.

In this example, although the up-switch condition is detected at the conclusion of keyframe 151, the up-switch doesn't occur until the up-switch position 271 at the conclusion of the next frame (non-keyframe 152). One reason for this is that the download of the HQ version 103 may not start until the detection of the up-switch condition. The download of the HQ version 103 may, therefore, need time to catch up to the playing of the LQ version 102. In the example of FIG. 2, the download of the HQ version 103 catches up to the playing of the LQ version 102 at the conclusion of non-keyframe 152, and the up-switch is performed at that position.

A portion of HQ version 103, referred to herein as skipped portion, may be downloaded and decoded but not displayed by the video player 135. In this example, the skipped portion of the HQ version 103 includes keyframe 161 and non-keyframe 162. Although the skipped portion may not be displayed, downloading and decoding of the skipped portion may nevertheless be necessary because the skipped portion includes keyframe 161 and non-keyframe 162, which may be required to determine a difference (delta) associated with other subsequent displayed frames (non-keyframes 163-164) in the HQ version.

Figure 3:
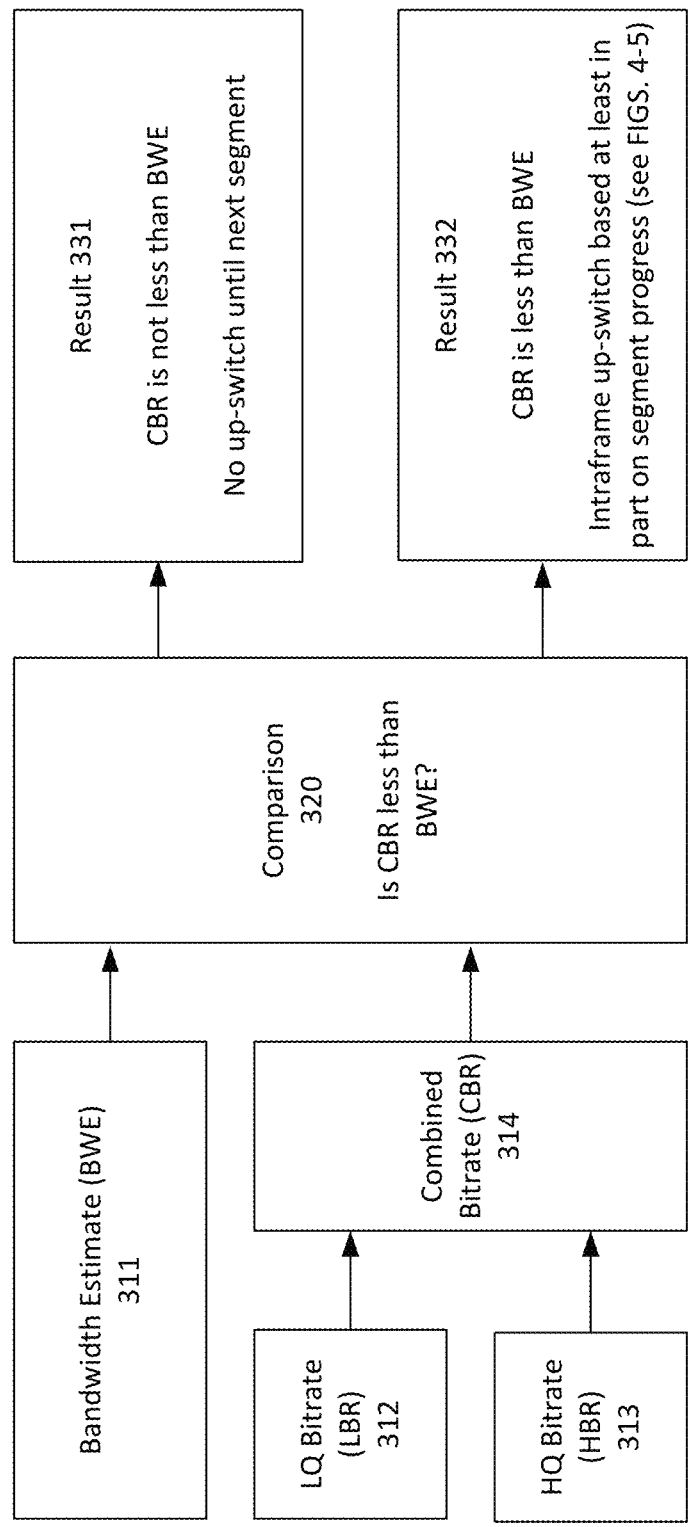
FIG. 3 is a diagram illustrating a first example up-switch determination comparison that may be used in accordance with the present disclosure.

After detection of the up-switch condition, the intra-segment up-switch component 133 of video player 135 may perform various calculations in order to determine whether to do an intra-segment up-switch of the video content 105. In some examples, the video player 135 may first determine whether there is sufficient bandwidth to download the current version (LQ version 102) of the segment 101 in combination with the new version (HQ version 103) of the segment 101. Referring now to FIG. 3, a diagram illustrating this example calculation will now be described in detail. In particular, as shown in FIG. 3, the video player may determine a bandwidth estimate (BWE) 311, which is an estimate of a current network bandwidth available to the video player 135, for example based on measurable network conditions over a particular time period. In some examples, the BWE 311 may be a moving average and/or sliding window bandwidth estimate that is repeatedly updated throughout the course of transmission of the video content 105. For example, the BWE 311 may be repeatedly updated at selected time intervals (e.g., every 10 seconds, etc.) and the current BWE 311 may reflect an estimate of the bandwidth for the most recent time interval for which it has been calculated. As also shown in FIG. 3, the video player may identify lower-quality bitrate (LBR) 312, which is a bitrate of LQ version 102, and higher-quality bitrate (HBR) 313, which is a bitrate of HQ version 103. In some examples, the LBR 312 and the HBR 313 may be indicated in information that may be sent from the video streaming service 120 to the video player 135, such as a playlist for segment 101. The LBR 312 and the HBR 313 may then be combined into a combined bitrate (CBR) 314. The video player 135 may then perform a comparison 320 to determine whether the CBR 314 is less than the BWE 311.

Result 331 represents a scenario in which the CBR 314 is not less than BWE 311. In this scenario, there may not be enough (or may only be just enough) bandwidth to download both the LQ version 102 and the HQ version 103 without resulting in a delay (e.g., buffering condition) to the display of the video. In this case, because a delay may negatively impact the user experience, the video player 135 may decide not to perform an intra-segment up-switch and to instead wait for the next segment (segment 111) to up-switch to a higher image quality. Result 332 represents a scenario in which the CBR 314 is less than BWE 311. In this scenario, there may be sufficient bandwidth to download both the LQ version 102 and the HQ version 103 without resulting in a delay (e.g., buffering condition) to the display of the video. In this scenario, an intra-segment up-switch may be performed, but may be based at least in part on segment progress, as will be described in greater detail below with reference to FIGS. 4-5.

It is noted that the comparison 320 shown in FIG. 3 is merely one example of the way in which bitrates of the LQ version 102 and HQ version 103 may be compared to the BWE 311—and that other techniques may be employed. For example, in some cases, because the BWE 311 is merely an estimate of the bandwidth (as opposed exact guarantee of the bandwidth), the video player 135 may decide not to perform an intra-segment up-switch even when the CBR 314 and the BWE 311 are equal or when the BWE 311 is only slightly higher than the CBR 314 (e.g., within a safety factor), as this may help to ensure that no delay occurs when the actual bandwidth is lower than estimated.

As described above, in some examples, if the CBR 314 is less than the BWE 311 (or less than a safety factor subtracted from the BWE 311), then the video player may determine, based at least in part on a progress of the current segment, whether to perform an intra-segment up-switch. In some examples, this may include a determination of whether there is enough time to download the new segment version (HQ version 103) prior to the end of the playing of the current segment (segment 101). As described above, the download of the HQ version 103 may not start until the detection of the up-switch condition. The download of the HQ version 103 may, therefore, need time to catch up to the playing of the LQ version 102. Some of examples of this calculation will now be described in detail below with reference to FIGS. 4-5.

Figure 4:
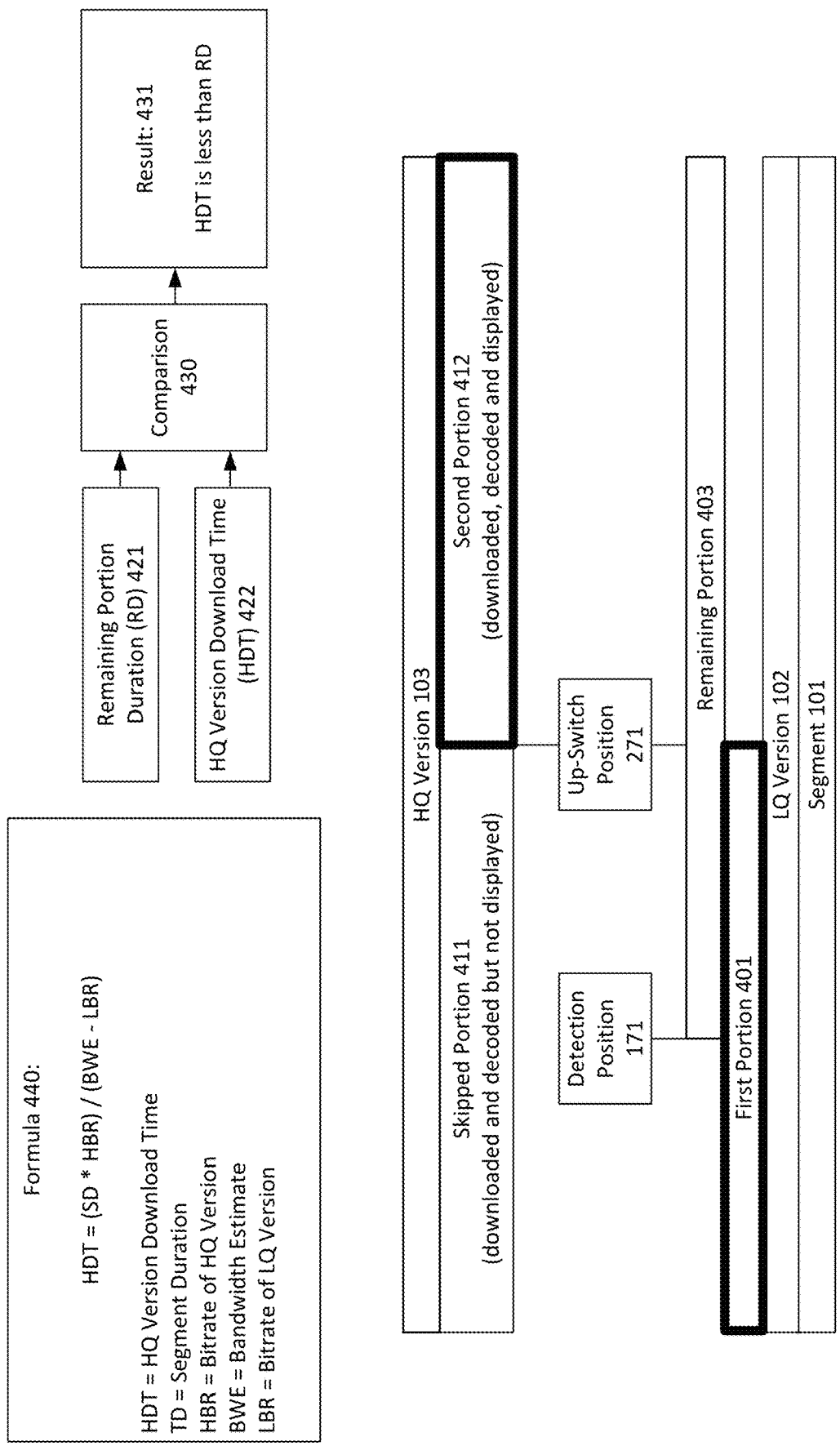
FIG. 4 is a diagram illustrating a second example up-switch determination comparison that may be used in accordance with the present disclosure.

In particular, FIG. 4 represents a scenario in which it is estimates that there is sufficient time to download the new segment version (HQ version 103) prior to the end of the playing of the current segment (segment 101). As shown in FIG. 4, upon detecting the up-switch condition (at detection position 171), the video player 135 may determine a remaining portion duration (RD) 421, which is an estimate of an amount of time that it will take the video player 135 to play a remaining portion 403 of the current segment version (LQ version 102). The remaining portion 403 is the portion of LQ version 102 that has not yet been played when the video player detects the up-switch condition. For example, in the case of FIGS. 1-2, the remaining portion 403 may include non-keyframes 152-154. In some examples, a segment duration (SD), which a duration for playing of the total current segment 101, may be indicated to the video player 135 by the video streaming service 120. Also, in some examples, the segment duration (SD) may be estimated by the video player 135 based on durations of prior segments of the video content 105. In some examples, the video player 135 may determine the remaining portion duration (RD) 421 by subtracting a duration of a portion of the segment 101 that has already been played prior to detection position 171 (e.g., keyframe 151 of FIG. 4) from the segment duration (SD).

In this example, the video player 135 also determines a higher-quality (HQ) version download time (HDT), which is an estimated amount of time required for downloading of the HQ version 103 by the video player 135. An example formula 440 for calculating the HDT 422 is shown in FIG. 4. As shown the HDT 422 may be calculated based on the HBR 313, the segment duration (SD), the BWE 311, the LBR 312. As shown in formula 440, the HDT may be calculated by performing a division operation in which a numerator (which is formed by multiplying the HBR 313 by the SD) is divided by a denominator (which is formed by subtracting the LBR 312 from the BWE 311). In some examples a safety factor time period (e.g., 0.5 seconds) may also be added into the HDT 422. Specifically, because the HDT 422 is merely an estimate of the time required for downloading of the HQ version 103, the safety factor may be added into the HDT 422 in order to help ensure that the actual time required to download the HQ version 103 will not exceed the RD 421.

As shown in FIG. 4, a comparison 430 is made to determine whether the HDT 422 is less than the RD 421. In the example of FIG. 4, a result 431 is calculated in which it is determined that the HDT 422 is less than the RD 421. This means that the video player 135 has estimated that it will be able to download to the HQ version 103 before reaching the end of the current segment (segment 101). Accordingly, in this scenario, the video player 135 may determine to perform the intra-segment up-switch. Specifically, the video player 135 may download, decode and display a first portion 401 of the LQ version 102. The first portion 401 extends from the start of segment 101 to the up-switch position 271. For example, in FIG. 2, the first portion includes keyframe 151 and non-keyframe 152. The displaying of the first portion 401 is indicated by the thick black outline surrounding first portion 401 in FIG. 4. At the up-switch position 271, the video player 135 up-switches from LQ version 102 to HQ version 103. As described above the up-switch may occur once the download of the HQ version 103 catches up to the playing of the LQ version 102. The video player 135 then displays a second portion 412 that extends from the up-switch position 271 to the end of segment 101. For example, in FIG. 2, the second portion 412 includes non-keyframes 163-164. The displaying of the second portion 412 is indicated by the thick black outline surrounding second portion 412 in FIG. 4. In the example of FIG. 4, although both skipped portion 411 and second portion 412 are downloaded and decoded by video player 135, only second portion 412 is displayed. Skipped portion 411 is not displayed. As described above, however, the downloading of skipped portion 411 may be necessary in order to display second portion 412.

As noted above, because the HDT 422 is merely an estimate of the amount of time it will take to download the HQ version 103. Thus, while unlikely, it is possible, in some cases, that the download of the HQ version 103 may not catch up to the playing of the LQ version 102. This may sometimes occur when network conditions are rapidly deteriorating. In these cases, a delay (e.g., buffering) of the video content 105 may be required in order to perform the intra-segment up-switch. In some examples, the video player 135 may choose to incur this delay or may instead choose not to perform the up-switch until the next segment 111.

Figure 5:
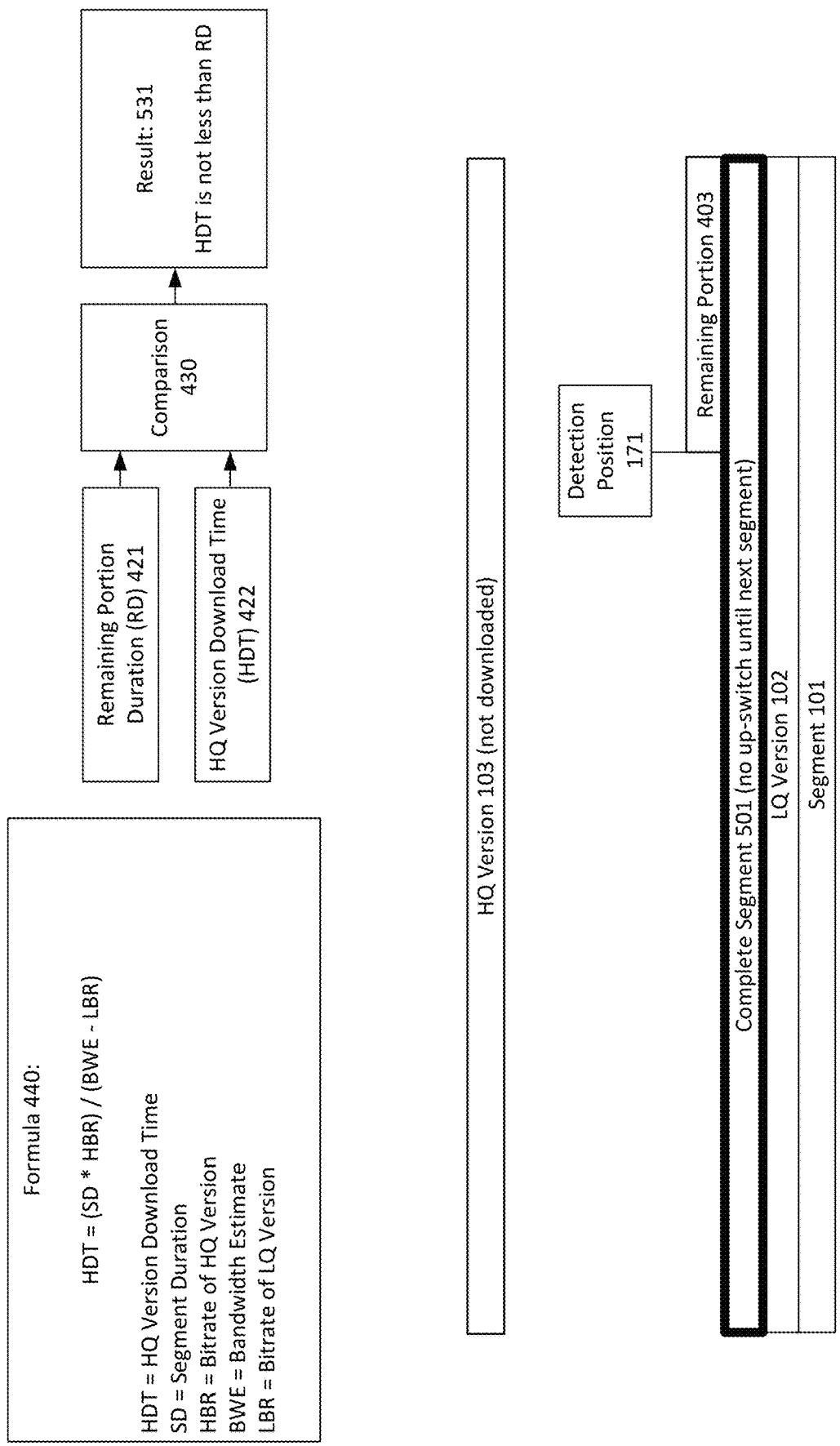
FIG. 5 is a diagram illustrating a third example up-switch determination comparison that may be used in accordance with the present disclosure.

While FIG. 4 depicts an example in which the video player 135 estimates that there is sufficient time to download the new segment version (HQ version 103) prior to the end of the playing of the current segment (segment 101), there may be some scenarios in which the video player 135 estimates that there is insufficient time to download the new segment version (HQ version 103) prior to the end of the playing of the current segment (segment 101). These scenarios may sometimes occur when an up-switch condition is detected towards the end of the playing of the segment 101. Referring now to FIG. 5, an example of a scenario in which the video player 135 estimates that the HQ version 103 cannot be downloaded prior to the end of the current segment will now be described in detail. As shown in FIG. 5, the up-switch condition is detected (at detection position 171 of FIG. 5) later in the segment (e.g., to the right of) the detection position 171 in FIG. 4. Thus, the remaining portion 403 of FIG. 5 is shorter than the remaining portion 403 of FIG. 4. Accordingly, remaining portion duration (RD) 421 in FIG. 4 will be less than the remaining portion duration (RD) 421 in FIG. 5. As shown in FIG. 5, a comparison 430 is made to determine whether the HDT 422 is less than the RD 421. However, in the example of FIG. 5, a result 531 is calculated in which it is determined that the HDT 422 is not less than the RD 421. This means that the video player 135 has estimated that it will not be able to download the HQ version 103 before reaching the end of the current segment (segment 101). Accordingly, in this scenario, the video player 135 may determine that it is not capable of performing the intra-segment up-switch (without adding a delay/buffering to the playing of the video content 105). Accordingly, the video player 135 may choose not to download the HQ version 103. Instead, a complete segment 501 of the LQ version 102 is downloaded, decoded and displayed. The video player 135 does not perform an up-switch until the start of the next segment (e.g., segment 111).

It is noted that, in some examples, in addition to HQ version 103, there may potentially be one or more other versions of segment 101 that may be available to video player 135 and that have a higher image quality than LQ version 102. In some examples, the video player 135 may employ various factors to determine which of these multiple available versions to which to up-switch. For example, in some cases, only one of the multiple versions may satisfy the criteria discussed above (e.g., CBR is less than BWE, and HDT is less than RD). In this case, the one version that satisfies the criteria may be selected. In some other scenarios, however, multiple versions may satisfy the above criteria. In these scenarios, various selection priorities may be employed to determine which version to which to switch. For example, the video player 135 may sometimes choose to switch to the highest quality version that satisfies the criteria—or may instead choose to switch to another version that may potentially allow an earlier up-switch position than the highest quality version.

Figure 6:
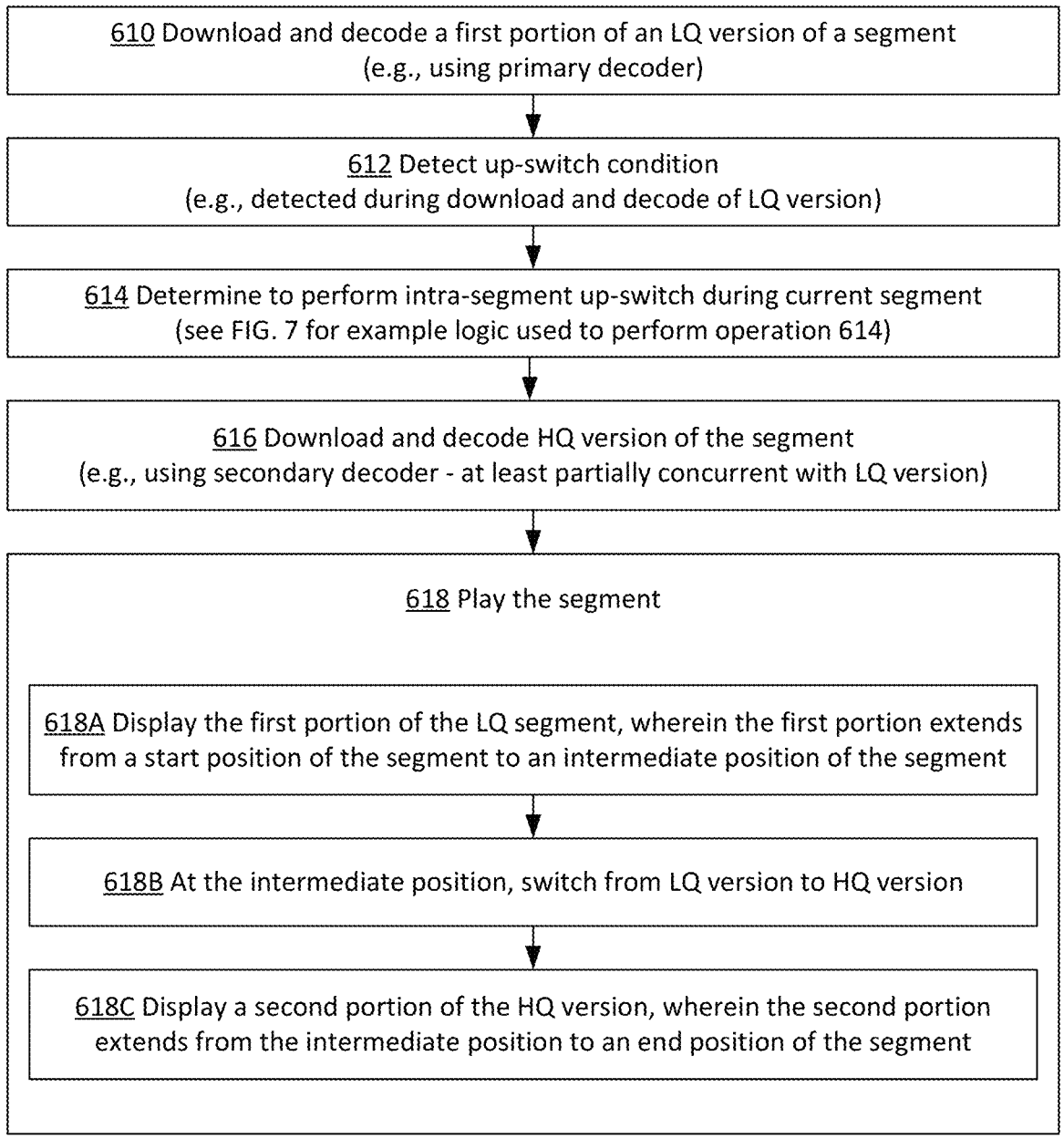
FIG. 6 is a flowchart illustrating an example process for performing an intra-segment up-switch that may be used in accordance with the present disclosure.

FIG. 6 is a flowchart illustrating an example process for performing an intra-segment up-switch that may be used in accordance with the present disclosure. The process of FIG. 6 is initiated at operation 610, at which a first portion of an LQ version of a video segment is downloaded and decoded. For example, as shown in FIG. 2, a first portion of LQ version 102, which includes keyframe 151 and non-keyframe 152, may be downloaded and decoded by a video player. As also described above, segment 101 has a plurality of versions including LQ version 102 and HQ version 103. The LQ version has a respective image quality, and the HQ version has a respective image quality. The image quality of the LQ version 102 is lower than the image quality of HQ version 103. The LQ version and the HQ version may include live video content that is downloaded and played using live streaming techniques.

At operation 612, at some point during the downloading and decoding of the first portion of the LQ version, an up-switch condition is detected. The up-switch condition is associated with upgrading from the image quality of the LQ version to the image quality of the HQ version. As described above, the up-switch condition may include, for example, a resizing of a video display, an increase in available bandwidth, and/or an initiation of transmission of the video content. In some examples, the up-switch condition may be detected by intra-segment up-switch component 133 of video player 135. In some cases, intra-segment up-switch component 133 may monitor the video display (and/or monitor user inputs related to the video display) to determine when the display is resized by the user. As also described above, the intra-segment up-switch component 133 may also repeatedly estimate the network bandwidth to determine when bandwidth may be decreasing or increasing.

At operation 614, a determination is made to perform an intra-segment up-switch during the current segment. As described above, this determination may be made based on the estimated bandwidth, the bitrates of the LQ and HQ versions, and the progress of the playing of the current segment. For example, as shown in FIG. 3, a first calculation may be made that a sum of a bitrate of the HQ version and a bitrate of the LQ version is less than an estimated network bandwidth. It may then be determined, based at least in part on the first calculation, to download and decode the HQ version. Additionally, as shown in FIG. 4, a first time duration may be determined for playing of a remaining un-played portion of the segment. This is the remaining portion duration (RD) 421 for playing of the remaining portion 403 of segment 101. Furthermore, a second time duration may be determined for downloading of the HQ version. This is the HQ version download time (HDT) 422 for downloading of HQ version 103. A second calculation may then made that the second time duration is less than the first time duration. It may then be determined, based at least in part on the second calculation, to download and decode the second version (see result 431 of FIG. 4). This and other example logic for performing operation 614 is described in greater detail below with reference to FIG. 7.

At operation 616, the HQ version of the segment is downloaded and decoded in its entirety. As described above, the downloading and decoding of the HQ version (at operation 616) may be triggered based at least in part on the detecting of the up-switch condition (at operation 612). For example, in some cases, the downloading and decoding of the HQ version (at operation 616) may be triggered based on a combination of the detecting of the up-switch condition (at operation 612) and determining to perform the intra-segment up-switch during the current segment (at operation 614). As also described above, at least part of the first portion of the LQ version and at least part of the HQ version may be decoded concurrently with one another using dual decoders. For example, as shown in FIG. 2, the LQ version may be downloaded by a primary decoder (e.g., decoder 134) and the HQ version may be downloaded by a secondary decoder (e.g., decoder 234). The use of dual decoders may assist in allowing the download of the HQ version to catch up to the playing of the LQ version, thereby enabling the intra-segment up-switch to be performed without delaying/buffering of the video content.

At operation 618, the segment is played by the video player. As shown in FIG. 6, operation 618 includes sub-operations 618A-C. Specifically, at sub-operation 618A, the first portion of the LQ version is displayed, wherein the first portion of the LQ version extends from a start position of the video segment to an intermediate position of the video segment. For example, as shown in FIG. 2, a first portion of the LQ version, which includes keyframe 151 and non-keyframe 152, is displayed by the video player. The displaying of keyframe 151 and non-keyframe 152 is indicated by the thick black outline surrounding keyframe 151 and non-keyframe 152 in FIG. 2. As also shown in FIG. 2, the first portion of the LQ version extends from a start of segment 101 (i.e., the start of keyframe 151) to an intermediate position of the video segment 101 (i.e., the end of non-keyframe 152—also referred to up-switch position 271).

At sub-operation 618B, at the intermediate position, the playing of the video segment is switched from the LQ version to the HQ version. For example, as shown in FIG. 2, at the conclusion of non-keyframe 152 (referred to as up-switch position 271), the video player switches the playing of segment 101 from LQ version 102 to HQ version 103. As described above, the download of the HQ version 103 may not start until the up-switch condition is detected at detection position 171. Thus, the download of the HQ version 103 may need to time to catch up to the playing of the LQ version 102. The video player may monitor the download of the HQ version 103 to detect when the download of the HQ version 103 catches up to the playing of the LQ version 102. In the example of FIG. 2, this occurs at the conclusion of the playing of non-keyframe 152. The video player may then switch from the LQ version to the HQ version at this intermediate position, which is the up-switch position 271 of FIG. 2.

At sub-operation 618C, a second portion of the HQ version is displayed, wherein the second portion of the HQ version extends from the intermediate position to an end position of the video segment. For example, as shown in FIG. 2, a second portion of the HQ version, which includes non-keyframes 163-164, is displayed by the video player. The displaying of non-keyframes 163-164 is indicated by the thick black outline surrounding non-keyframes 163-164 in FIG. 2. As also shown in FIG. 2, the second portion of the HQ version extends from an intermediate position of the video segment 101 (i.e., the start of non-keyframe 163—also referred to as up-switch position 271) to an end of segment 101 (i.e., the end of non-keyframe 164). As described above, a skipped portion of the HQ version extends from the start position to the intermediate position (from the start of keyframe 161 to the end of non-keyframe 162), and the skipped portion is downloaded and decoded but not displayed. Although the skipped portion is not displayed, the skipped portion (including keyframe 161 and non-keyframe 162) may include information that is required for displaying of the second portion of the HQ segment (including non-keyframes 163-164).

Figure 7:
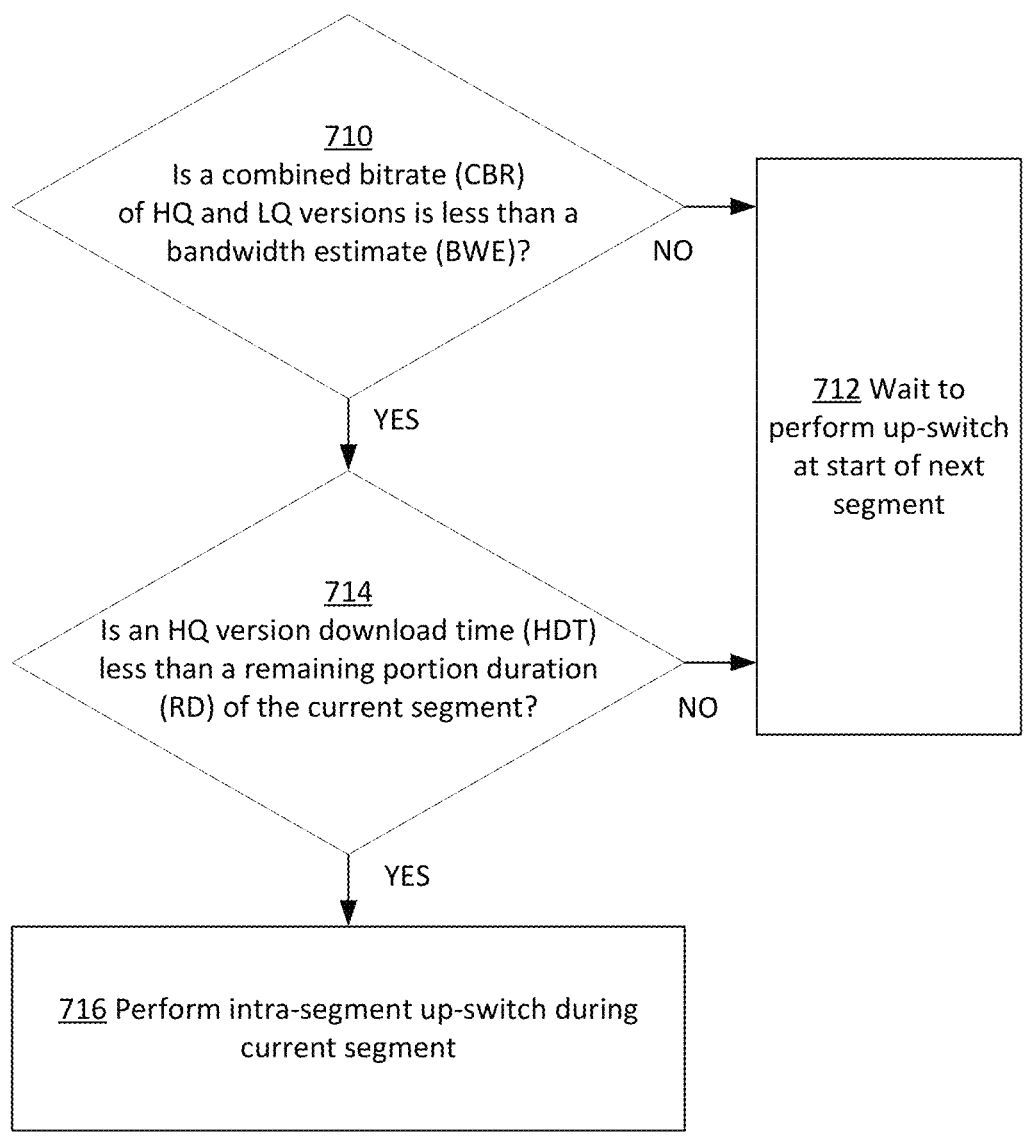
FIG. 7 is a flowchart illustrating an example process for determining to perform an intra-segment up-switch that may be used in accordance with the present disclosure.

Referring now to FIG. 7, example logic for determining whether to perform an intra-segment up-switch will now be described in detail. As described above, FIG. 7 may include an example of the logic that is used to perform operation 614 of FIG. 6. In particular, the process of FIG. 7 is initiated at operation 710, at which it is determined whether a combined bitrate (CBR) of the LQ version and the HQ version is less than a bandwidth estimate (BWE). As shown in FIG. 3, a combined bitrate (CBR) 314 may be determined by adding the lower-quality bitrate (LBR) 312, which is the bitrate of LQ version 102, and the higher-quality bitrate (HBR) 313, which is the bitrate of HQ version 103. The CBR 314 may then be compared to the BWE 311 to determine whether the CBR 314 is less than the BWE 311. As described above, the BWE 311 is an estimate of a current network bandwidth available to the video player 135. The BWE 311 may be a moving average and/or sliding window bandwidth estimate that is repeatedly updated throughout the course of transmission of the video content 105. As also described above, in some examples, the CBR may be required to be less than the BWE by a selected amount (a safety factor) in order to perform the intra-segment up-switch.

If, at operation 710, it is determined that the CBR is not less than the BWE (or that the CBR is not less than the BWE by a selected amount/safety factor), then, at operation 712, a determination is made to wait to perform an up-switch at the start of the next segment. In this scenario, the intra-segment up-switch is not performed, and the HQ version of the current segment is not downloaded.

By contrast, if, at operation 710, it is determined that the CBR is less than the BWE (or that the CBR is less than the BWE by a selected amount/safety factor), then the process proceeds to operation 714. At operation 714, it is determined whether an HQ version download time (HDT) is less than the remaining portion duration (RD). As shown in FIG. 4, the remaining portion duration (RD) 421 is the duration for playing of the remaining portion 403 of the current segment (segment 101). The RD may be calculated by subtracting the duration of the current segment that has already been played from the segment duration (SD), which is the duration for playing the total current segment. The HDT 422 is the estimated time required for downloading of the HQ version 103. As shown in formula 440, the HDT may be calculated by performing a division operation in which a numerator (which is formed by multiplying the HBR 313 by the SD) is divided by a denominator (which is formed by subtracting the LBR 312 from the BWE 311). In some examples a safety factor time period (e.g., 0.5 seconds) may also be added into the HDT 422. Specifically, because the HDT 422 is merely an estimate of the time required for downloading of the HQ version 103, the safety factor may be added into the HDT 422 in order to help ensure that the actual time required to download the HQ version 103 will not exceed the RD 421.

If, at operation 714, it is determined that the HDT is not less than the RD, then, at operation 712, a determination is made to wait to perform up-switch at the start of the next segment. In this scenario, the intra-segment up-switch is not performed, and the HQ version of the current segment is not downloaded. By contrast, if, at operation 714, it is determined that the HDT is less than the RD, then the process proceeds to operation 716, at which a determination is made to perform the intra-segment up-switch during the current segment. In this scenario, operation 714 may be followed by operation 616 of FIG. 6, in which the HQ version is downloaded and decoded, and the remainder of the process of FIG. 6 may then be performed accordingly.

Figure 8:
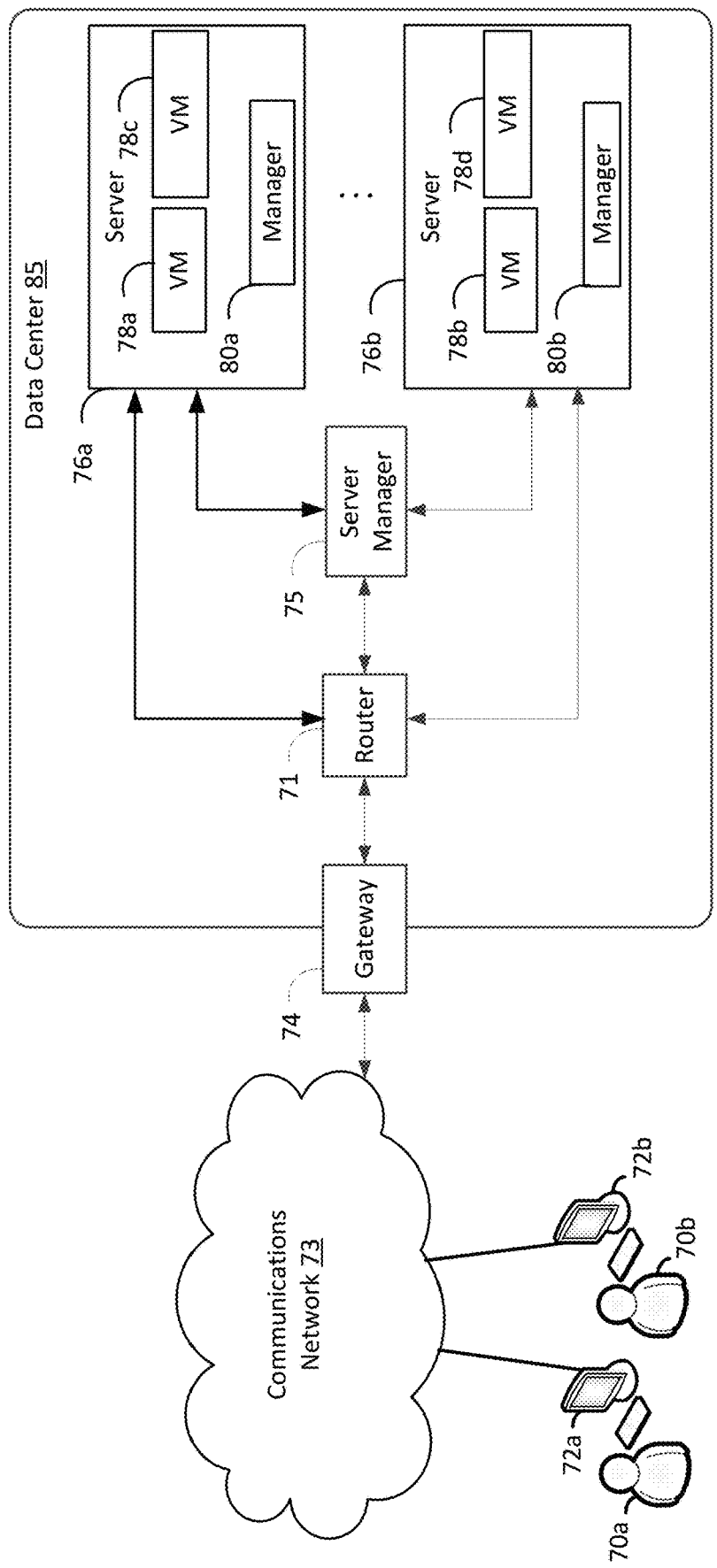
FIG. 8 is a diagram illustrating an example system for transmitting and providing data that may be used in accordance with the present disclosure.

An example system for transmitting and providing data will now be described in detail. In particular, FIG. 8 illustrates an example computing environment in which the embodiments described herein may be implemented. FIG. 8 is a diagram schematically illustrating an example of a data center 85 that can provide computing resources to users 70*a* and 70*b* (which may be referred herein singularly as user 70 or in the plural as users 70) via user computers 72*a* and 72*b* (which may be referred herein singularly as computer 72 or in the plural as computers 72) via a communications network 73. Data center 85 may be configured to provide computing resources for executing applications on a permanent or an as-needed basis. The computing resources provided by data center 85 may include various types of resources, such as gateway resources, load balancing resources, routing resources, networking resources, computing resources, volatile and non-volatile memory resources, content delivery resources, data processing resources, data storage resources, data communication resources and the like. Each type of computing resource may be available in a number of specific configurations. For example, data processing resources may be available as virtual machine instances that may be configured to provide various web services. In addition, combinations of resources may be made available via a network and may be configured as one or more web services. The instances may be configured to execute applications, including web services, such as application services, media services, database services, processing services, gateway services, storage services, routing services, security services, encryption services, load balancing services, application services and the like. These services may be configurable with set or custom applications and may be configurable in size, execution, cost, latency, type, duration, accessibility and in any other dimension. These web services may be configured as available infrastructure for one or more clients and can include one or more applications configured as a platform or as software for one or more clients. These web services may be made available via one or more communications protocols. These communications protocols may include, for example, hypertext transfer protocol (HTTP) or non-HTTP protocols. These communications protocols may also include, for example, more reliable transport layer protocols, such as transmission control protocol (TCP), and less reliable transport layer protocols, such as user datagram protocol (UDP). Data storage resources may include file storage devices, block storage devices and the like.

Each type or configuration of computing resource may be available in different sizes, such as large resources—consisting of many processors, large amounts of memory and/or large storage capacity—and small resources—consisting of fewer processors, smaller amounts of memory and/or smaller storage capacity. Customers may choose to allocate a number of small processing resources as web servers and/or one large processing resource as a database server, for example.

Data center 85 may include servers 76*a* and 76*b* (which may be referred herein singularly as server 76 or in the plural as servers 76) that provide computing resources. These resources may be available as bare metal resources or as virtual machine instances 78*a-d* (which may be referred herein singularly as virtual machine instance 78 or in the plural as virtual machine instances 78).

The availability of virtualization technologies for computing hardware has afforded benefits for providing large scale computing resources for customers and allowing computing resources to be efficiently and securely shared between multiple customers. For example, virtualization technologies may allow a physical computing device to be shared among multiple users by providing each user with one or more virtual machine instances hosted by the physical computing device. A virtual machine instance may be a software emulation of a particular physical computing system that acts as a distinct logical computing system. Such a virtual machine instance provides isolation among multiple operating systems sharing a given physical computing resource. Furthermore, some virtualization technologies may provide virtual resources that span one or more physical resources, such as a single virtual machine instance with multiple virtual processors that span multiple distinct physical computing systems.

Referring to FIG. 8, communications network 73 may, for example, be a publicly accessible network of linked networks and possibly operated by various distinct parties, such as the Internet. In other embodiments, communications network 73 may be a private network, such as a corporate or university network that is wholly or partially inaccessible to non-privileged users. In still other embodiments, communications network 73 may include one or more private networks with access to and/or from the Internet.

Communication network 73 may provide access to computers 72. User computers 72 may be computers utilized by users 70 or other customers of data center 85. For instance, user computer 72a or 72b may be a server, a desktop or laptop personal computer, a tablet computer, a wireless telephone, a personal digital assistant (PDA), an e-book reader, a game console, a set-top box or any other computing device capable of accessing data center 85. User computer 72a or 72b may connect directly to the Internet (e.g., via a cable modem or a Digital Subscriber Line (DSL)). Although only two user computers 72a and 72b are depicted, it should be appreciated that there may be multiple user computers.

User computers 72 may also be utilized to configure aspects of the computing resources provided by data center 85. In this regard, data center 85 might provide a gateway or web interface through which aspects of its operation may be configured through the use of a web browser application program executing on user computer 72. Alternately, a stand-alone application program executing on user computer 72 might access an application programming interface (API) exposed by data center 85 for performing the configuration operations. Other mechanisms for configuring the operation of various web services available at data center 85 might also be utilized.

Servers 76 shown in FIG. 8 may be servers configured appropriately for providing the computing resources described above and may provide computing resources for executing one or more web services and/or applications. In one embodiment, the computing resources may be virtual machine instances 78. In the example of virtual machine instances, each of the servers 76 may be configured to execute an instance manager 80a or 80b (which may be referred herein singularly as instance manager 80 or in the plural as instance managers 80) capable of executing the virtual machine instances 78. The instance managers 80 may be a virtual machine monitor (VMM) or another type of program configured to enable the execution of virtual machine instances 78 on server 76, for example. As discussed above, each of the virtual machine instances 78 may be configured to execute all or a portion of an application.

It should be appreciated that although the embodiments disclosed above discuss the context of virtual machine instances, other types of implementations can be utilized with the concepts and technologies disclosed herein. For example, the embodiments disclosed herein might also be utilized with computing systems that do not utilize virtual machine instances.

In the example data center 85 shown in FIG. 8, a router 71 may be utilized to interconnect the servers 76a and 76b. Router 71 may also be connected to gateway 74, which is connected to communications network 73. Router 71 may be connected to one or more load balancers, and alone or in combination may manage communications within networks in data center 85, for example, by forwarding packets or other data communications as appropriate based on characteristics of such communications (e.g., header information including source and/or destination addresses, protocol identifiers, size, processing requirements, etc.) and/or the characteristics of the private network (e.g., routes based on network topology, etc.). It will be appreciated that, for the sake of simplicity, various aspects of the computing systems and other devices of this example are illustrated without showing certain conventional details. Additional computing systems and other devices may be interconnected in other embodiments and may be interconnected in different ways.

In the example data center 85 shown in FIG. 8, a server manager 75 is also employed to at least in part direct various communications to, from and/or between servers 76a and 76b. While FIG. 8 depicts router 71 positioned between gateway 74 and server manager 75, this is merely an exemplary configuration. In some cases, for example, server manager 75 may be positioned between gateway 74 and router 71. Server manager 75 may, in some cases, examine portions of incoming communications from user computers 72 to determine one or more appropriate servers 76 to receive and/or process the incoming communications. Server manager 75 may determine appropriate servers to receive and/or process the incoming communications based on factors such as an identity, location or other attributes associated with user computers 72, a nature of a task with which the communications are associated, a priority of a task with which the communications are associated, a duration of a task with which the communications are associated, a size and/or estimated resource usage of a task with which the communications are associated and many other factors. Server manager 75 may, for example, collect or otherwise have access to state information and other information associated with various tasks in order to, for example, assist in managing communications and other operations associated with such tasks.

It should be appreciated that the network topology illustrated in FIG. 8 has been greatly simplified and that many more networks and networking devices may be utilized to interconnect the various computing systems disclosed herein. These network topologies and devices should be apparent to those skilled in the art.

It should also be appreciated that data center 85 described in FIG. 8 is merely illustrative and that other implementations might be utilized. It should also be appreciated that a server, gateway or other computing device may comprise any combination of hardware or software that can interact and perform the described types of functionality, including without limitation: desktop or other computers, database servers, network storage devices and other network devices, PDAs, tablets, cellphones, wireless phones, pagers, electronic organizers, Internet appliances, television-based systems (e.g., using set top boxes and/or personal/digital video recorders) and various other consumer products that include appropriate communication capabilities.

Figure 9:
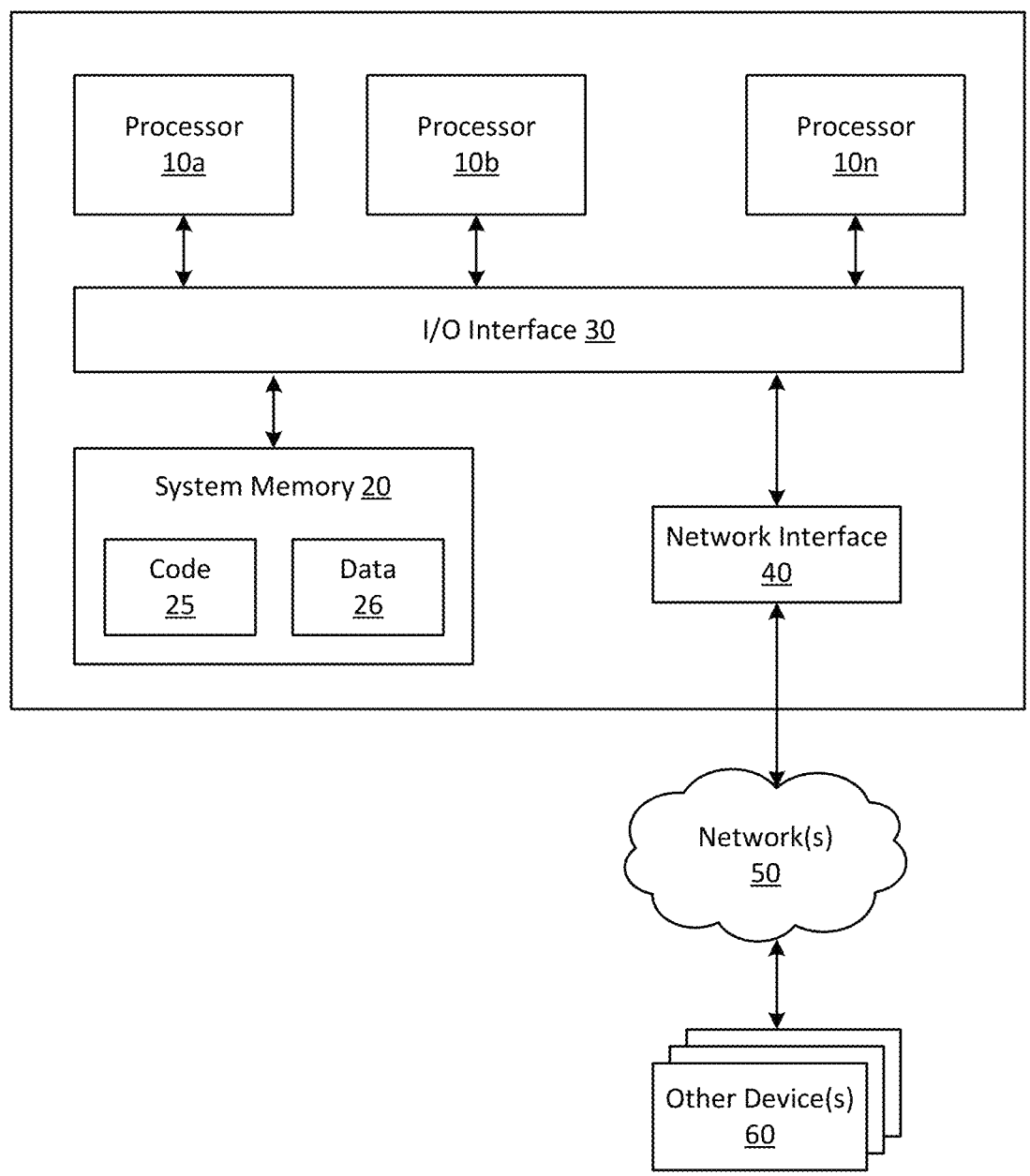
FIG. 9 is a diagram illustrating an example computing system that may be used in accordance with the present disclosure.

In at least some embodiments, a server that implements a portion or all of one or more of the technologies described herein may include a computer system that includes or is configured to access one or more computer-accessible media. FIG. 9 depicts a computer system that includes or is configured to access one or more computer-accessible media. In the illustrated embodiment, computing device 15 includes one or more processors 10a, 10b and/or 10n (which may be referred herein singularly as "a processor 10" or in the plural as "the processors 10") coupled to a system memory 20 via an input/output (I/O) interface 30. Computing device 15 further includes a network interface 40 coupled to I/O interface 30.

In various embodiments, computing device 15 may be a uniprocessor system including one processor 10 or a multiprocessor system including several processors 10 (e.g., two, four, eight or another suitable number). Processors 10 may be any suitable processors capable of executing instructions. For example, in various embodiments, processors 10 may be embedded processors implementing any of a variety of instruction set architectures (ISAs), such as the x86, PowerPC, SPARC or MIPS ISAs or any other suitable ISA. In multiprocessor systems, each of processors 10 may commonly, but not necessarily, implement the same ISA.

System memory 20 may be configured to store instructions and data accessible by processor(s) 10. In various embodiments, system memory 20 may be implemented using any suitable memory technology, such as static random access memory (SRAM), synchronous dynamic RAM (SDRAM), nonvolatile/Flash®-type memory or any other type of memory. In the illustrated embodiment, program instructions and data implementing one or more desired functions, such as those methods, techniques and data described above, are shown stored within system memory 20 as code 25 and data 26.

In one embodiment, I/O interface 30 may be configured to coordinate I/O traffic between processor 10, system memory 20 and any peripherals in the device, including network interface 40 or other peripheral interfaces. In some embodiments, I/O interface 30 may perform any necessary protocol, timing or other data transformations to convert data signals from one component (e.g., system memory 20) into a format suitable for use by another component (e.g., processor 10). In some embodiments, I/O interface 30 may include support for devices attached through various types of peripheral buses, such as a variant of the Peripheral Component Interconnect (PCI) bus standard or the Universal Serial Bus (USB) standard, for example. In some embodiments, the function of I/O interface 30 may be split into two or more separate components, such as a north bridge and a south bridge, for example. Also, in some embodiments some or all of the functionality of I/O interface 30, such as an interface to system memory 20, may be incorporated directly into processor 10.

Network interface 40 may be configured to allow data to be exchanged between computing device 15 and other device or devices 60 attached to a network or networks 50, such as other computer systems or devices, for example. In various embodiments, network interface 40 may support communication via any suitable wired or wireless general data networks, such as types of Ethernet networks, for example. Additionally, network interface 40 may support communication via telecommunications/telephony networks, such as analog voice networks or digital fiber communications networks, via storage area networks such as Fibre Channel SANs (storage area networks) or via any other suitable type of network and/or protocol.

In some embodiments, system memory 20 may be one embodiment of a computer-accessible medium configured to store program instructions and data as described above for implementing embodiments of the corresponding methods and apparatus. However, in other embodiments, program instructions and/or data may be received, sent or stored upon different types of computer-accessible media. Generally speaking, a computer-accessible medium may include non-transitory storage media or memory media, such as magnetic or optical media—e.g., disk or DVD/CD coupled to computing device 15 via I/O interface 30. A non-transitory computer-accessible storage medium may also include any volatile or non-volatile media, such as RAM (e.g., SDRAM, DDR SDRAM, RDRAM, SRAM, etc.), ROM (read only memory) etc., that may be included in some embodiments of computing device 15 as system memory 20 or another type of memory. Further, a computer-accessible medium may include transmission media or signals such as electrical, electromagnetic or digital signals conveyed via a communication medium, such as a network and/or a wireless link, such as those that may be implemented via network interface 40.

A network set up by an entity, such as a company or a public sector organization, to provide one or more web services (such as various types of cloud-based computing or storage) accessible via the Internet and/or other networks to a distributed set of clients may be termed a provider network. Such a provider network may include numerous data centers hosting various resource pools, such as collections of physical and/or virtualized computer servers, storage devices, networking equipment and the like, needed to implement and distribute the infrastructure and web services offered by the provider network. The resources may in some embodiments be offered to clients in various units related to the web service, such as an amount of storage capacity for storage, processing capability for processing, as instances, as sets of related services and the like. A virtual computing instance may, for example, comprise one or more servers with a specified computational capacity (which may be specified by indicating the type and number of CPUs, the main memory size and so on) and a specified software stack (e.g., a particular version of an operating system, which may in turn run on top of a hypervisor).

A compute node, which may be referred to also as a computing node, may be implemented on a wide variety of computing environments, such as commodity-hardware computers, virtual machines, web services, computing clusters and computing appliances. Any of these computing devices or environments may, for convenience, be described as compute nodes.

A number of different types of computing devices may be used singly or in combination to implement the resources of the provider network in different embodiments, for example computer servers, storage devices, network devices and the like. In some embodiments a client or user may be provided direct access to a resource instance, e.g., by giving a user an administrator login and password. In other embodiments the provider network operator may allow clients to specify execution requirements for specified client applications and schedule execution of the applications on behalf of the client on execution platforms (such as application server instances, Java' virtual machines (JVMs), general-purpose or special-purpose operating systems, platforms that support various interpreted or compiled programming languages such as Ruby, Perl, Python, C, C++ and the like or high-performance computing platforms) suitable for the applications, without, for example, requiring the client to access an instance or an execution platform directly. A given execution platform may utilize one or more resource instances in some implementations; in other implementations, multiple execution platforms may be mapped to a single resource instance.

In many environments, operators of provider networks that implement different types of virtualized computing, storage and/or other network-accessible functionality may allow customers to reserve or purchase access to resources in various resource acquisition modes. The computing resource provider may provide facilities for customers to select and launch the desired computing resources, deploy application components to the computing resources and maintain an application executing in the environment. In addition, the computing resource provider may provide further facilities for the customer to quickly and easily scale up or scale down the numbers and types of resources allocated to the application, either manually or through automatic scaling, as demand for or capacity requirements of the application change. The computing resources provided by the computing resource provider may be made available in discrete units, which may be referred to as instances. An instance may represent a physical server hardware platform, a virtual machine instance executing on a server or some combination of the two. Various types and configurations of instances may be made available, including different sizes of resources executing different operating systems (OS) and/or hypervisors, and with various installed software applications, runtimes and the like. Instances may further be available in specific availability zones, representing a logical region, a fault tolerant region, a data center or other geographic location of the underlying computing hardware, for example. Instances may be copied within an availability zone or across availability zones to improve the redundancy of the instance, and instances may be migrated within a particular availability zone or across availability zones. As one example, the latency for client communications with a particular server in an availability zone may be less than the latency for client communications with a different server. As such, an instance may be migrated from the higher latency server to the lower latency server to improve the overall client experience.

In some embodiments the provider network may be organized into a plurality of geographical regions, and each region may include one or more availability zones. An availability zone (which may also be referred to as an availability container) in turn may comprise one or more distinct locations or data centers, configured in such a way that the resources in a given availability zone may be isolated or insulated from failures in other availability zones. That is, a failure in one availability zone may not be expected to result in a failure in any other availability zone. Thus, the availability profile of a resource instance is intended to be independent of the availability profile of a resource instance in a different availability zone. Clients may be able to protect their applications from failures at a single location by launching multiple application instances in respective availability zones. At the same time, in some implementations inexpensive and low latency network connectivity may be provided between resource instances that reside within the same geographical region (and network transmissions between resources of the same availability zone may be even faster).

As set forth above, content may be provided by a content provider to one or more clients. The term content, as used herein, refers to any presentable information, and the term content item, as used herein, refers to any collection of any such presentable information. A content provider may, for example, provide one or more content providing services for providing content to clients. The content providing services may reside on one or more servers. The content providing services may be scalable to meet the demands of one or more customers and may increase or decrease in capability based on the number and type of incoming client requests. Portions of content providing services may also be migrated to be placed in positions of reduced latency with requesting clients. For example, the content provider may determine an "edge" of a system or network associated with content providing services that is physically and/or logically closest to a particular client. The content provider may then, for example, "spin-up," migrate resources or otherwise employ components associated with the determined edge for interacting with the particular client. Such an edge determination process may, in some cases, provide an efficient technique for identifying and employing components that are well suited to interact with a particular client, and may, in some embodiments, reduce the latency for communications between a content provider and one or more clients.

In addition, certain methods or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel or in some other manner. Blocks or states may be added to or removed from the disclosed example embodiments.

It will also be appreciated that various items are illustrated as being stored in memory or on storage while being used, and that these items or portions thereof may be transferred between memory and other storage devices for purposes of memory management and data integrity. Alternatively, in other embodiments some or all of the software modules and/or systems may execute in memory on another device and communicate with the illustrated computing systems via inter-computer communication. Furthermore, in some embodiments, some or all of the systems and/or modules may be implemented or provided in other ways, such as at least partially in firmware and/or hardware, including, but not limited to, one or more application-specific integrated circuits (ASICs), standard integrated circuits, controllers (e.g., by executing appropriate instructions, and including microcontrollers and/or embedded controllers), field-programmable gate arrays (FPGAs), complex programmable logic devices (CPLDs), etc. Some or all of the modules, systems and data structures may also be stored (e.g., as software instructions or structured data) on a computer-readable medium, such as a hard disk, a memory, a network or a portable media article to be read by an appropriate drive or via an appropriate connection. The systems, modules and data structures may also be transmitted as generated data signals (e.g., as part of a carrier wave or other analog or digital propagated signal) on a variety of computer-readable transmission media, including wireless-based and wired/cable-based media, and may take a variety of forms (e.g., as part of a single or multiplexed analog signal, or as multiple discrete digital packets or frames). Such computer program products may also take other forms in other embodiments. Accordingly, the present invention may be practiced with other computer system configurations.

Conditional language used herein, such as, among others, "can," "could," "might," "may," "e.g." and the like, unless specifically stated otherwise, or otherwise understood within the context as used, is generally intended to convey that certain embodiments include, while other embodiments do not include, certain features, elements, and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having" and the like are synonymous and are used inclusively, in an open-ended fashion, and do not exclude additional elements, features, acts, operations and so forth. Also, the term "or" is used in its inclusive sense (and not in its exclusive sense) so that when used, for example, to connect a list of elements, the term "or" means one, some or all of the elements in the list.

While certain example embodiments have been described, these embodiments have been presented by way of example only and are not intended to limit the scope of the inventions disclosed herein. Thus, nothing in the foregoing description is intended to imply that any particular feature, characteristic, step, module or block is necessary or indispensable. Indeed, the novel methods and systems described herein may be embodied in a variety of other forms; furthermore, various omissions, substitutions and changes in the form of the methods and systems described herein may be made without departing from the spirit of the inventions disclosed herein. The accompanying claims and their equivalents are intended to cover such forms or modifications as would fall within the scope and spirit of certain of the inventions disclosed herein.

What is claimed is:

1. A computer-implemented method comprising:
   downloading and decoding a first portion of a first version of a video segment of video content, wherein the video segment has a plurality of versions, the plurality of versions including the first version and a second version, the first version having a first image quality, the second version having a second image quality, wherein the first image quality is lower than the second image quality;
   calculating that a sum of a first bitrate of the first version and a second bitrate of the second version is less than an estimated network bandwidth;
   determining, based at least in part on the calculating, to download and decode the second version;
   downloading and decoding the second version in its entirety; and
   playing the video segment, wherein the playing of the video segment includes:
      displaying the first portion of the first version, wherein the first portion of the first version extends from a start position of the video segment to an intermediate position of the video segment;
      at the intermediate position, switching the playing of the video segment from the first version to the second version; and
      displaying a second portion of the second version, wherein the second portion of the second version extends from the intermediate position to an end position of the video segment.

2. The computer-implemented method of claim 1, wherein a third portion of the second version extends from the start position to the intermediate position, and wherein the third portion is downloaded and decoded but not displayed.

3. The computer-implemented method of claim 1, wherein at least part of the first portion of the first version and at least part of the second version are decoded concurrently with one another.

4. The computer-implemented method of claim 1, wherein the first version and the second version include live video content that is downloaded and played using live streaming techniques.

5. The computer-implemented method of claim 1, further comprising detecting an up-switch condition associated with upgrading from the first image quality to the second image quality, wherein the downloading and decoding of the second version is triggered based in part on the detecting of the up-switch condition.

6. The computer-implemented method of claim 5, wherein the up-switch condition comprises at least one of a resizing of a video display, an increase in available bandwidth, or an initiation of transmission of the video content.

7. The computer-implemented method of claim 5, wherein the up-switch condition is detected during the downloading and decoding of the first portion of the first version.

8. One or more non-transitory computer-readable storage media having stored thereon computing instructions that, upon execution by one or more computing devices, cause the one or more computing devices to perform operations comprising:
   downloading and decoding a first portion of a first version of a video segment of video content, wherein the video segment has a plurality of versions, the plurality of versions including the first version and a second version, the first version having a first image quality, the second version having a second image quality, wherein the first image quality is lower than the second image quality;
   determining a first time duration for playing of a remaining un-played portion of the video segment;
   determining a second time duration for downloading of the second version;
   calculating that the second time duration is less than the first time duration;
   determining, based at least in part on the calculating, to download and decode the second version;
   downloading and decoding the second version in its entirety; and
   playing the video segment, wherein the playing of the video segment includes:
      displaying the first portion of the first version, wherein the first portion of the first version extends from a start position of the video segment to an intermediate position of the video segment;
      at the intermediate position, switching the playing of the video segment from the first version to the second version; and
      displaying a second portion of the second version, wherein the second portion of the second version extends from the intermediate position to an end position of the video segment.

9. The one or more non-transitory computer-readable storage media of claim 8, wherein a third portion of the second version extends from the start position to the intermediate position, and wherein the third portion is downloaded and decoded but not displayed.

10. The one or more non-transitory computer-readable storage media of claim 8, wherein at least part of the first portion of the first version and at least part of the second version are decoded concurrently with one another.

11. The one or more non-transitory computer-readable storage media of claim 8, further comprising detecting an up-switch condition associated with upgrading from the first image quality to the second image quality, wherein the downloading and decoding of the second version is triggered based in part on the detecting of the up-switch condition.

12. The one or more non-transitory computer-readable storage media of claim 11, wherein the up-switch condition is detected during the downloading and decoding of the first portion of the first version.

13. A computing system comprising:
one or more processors; and
one or more memories having stored therein computing instructions that, upon execution by the one or more processors, cause the computing system to perform operations comprising:
downloading and decoding a first portion of a first version of a video segment of video content, wherein the video segment has a plurality of versions, the plurality of versions including the first version and a second version, the first version having a first image quality, the second version having a second image quality, wherein the first image quality is lower than the second image quality;
calculating that a sum of a first bitrate of the first version and a second bitrate of the second version is less than an estimated network bandwidth;
determining, based at least in part on the calculating, to download and decode the second version;
downloading and decoding the second version in its entirety; and
playing the video segment, wherein the playing of the video segment includes:
displaying the first portion of the first version, wherein the first portion of the first version extends from a start position of the video segment to an intermediate position of the video segment;
at the intermediate position, switching the playing of the video segment from the first version to the second version; and
displaying a second portion of the second version, wherein the second portion of the second version extends from the intermediate position to an end position of the video segment.

14. The computing system of claim 13, wherein a third portion of the second version extends from the start position to the intermediate position, and wherein the third portion is downloaded and decoded but not displayed.

15. The computing system of claim 13, wherein at least part of the first portion of the first version and at least part of the second version are decoded concurrently with one another.

16. The computing system of claim 13, wherein the first version and the second version include live video content that is downloaded and played using live streaming techniques.

17. The computing system of claim 13, wherein the operations further comprise detecting an up-switch condition associated with upgrading from the first image quality to the second image quality, wherein the downloading and decoding of the second version is triggered based in part on the detecting of the up-switch condition.

18. The computing system of claim 17, wherein the up-switch condition comprises at least one of a resizing of a video display, an increase in available bandwidth, or an initiation of transmission of the video content.

19. The computing system of claim 17, wherein the up-switch condition is detected during the downloading and decoding of the first portion of the first version.

20. The one or more non-transitory computer-readable storage media of claim 11, wherein the up-switch condition comprises at least one of a resizing of a video display, an increase in available bandwidth, or an initiation of transmission of the video content.

* * * * *